United States Patent
Yoshima

(10) Patent No.: US 8,933,371 B2
(45) Date of Patent: Jan. 13, 2015

(54) TANDEM ARC WELDING DEVICE

(75) Inventor: Kazumasa Yoshima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 2075 days.

(21) Appl. No.: 11/917,247

(22) PCT Filed: Feb. 22, 2007

(86) PCT No.: PCT/JP2007/053296
§ 371 (c)(1),
(2), (4) Date: Dec. 12, 2007

(87) PCT Pub. No.: WO2007/144999
PCT Pub. Date: Dec. 21, 2007

(65) Prior Publication Data
US 2009/0308855 A1    Dec. 17, 2009

(30) Foreign Application Priority Data
Jun. 14, 2006   (JP) .................. 2006-164303

(51) Int. Cl.
*B23K 9/09*   (2006.01)
*B23K 9/173*  (2006.01)
*B23K 9/10*   (2006.01)

(52) U.S. Cl.
CPC ............. *B23K 9/1735* (2013.01); *B23K 9/1062* (2013.01)
USPC ................................. 219/137 PS; 219/130.51

(58) Field of Classification Search
USPC ....... 219/125.1, 130.01, 130.51, 136, 137 PS, 219/137.7, 137 R, 137.2
See application file for complete search history.

(56) References Cited

U.S. PATENT DOCUMENTS

2004/0035839 A1*   2/2004   Stava et al. ............... 219/130.51

FOREIGN PATENT DOCUMENTS

| JP | 10-225768   | 8/1998 |
| JP | 2003-053535 | 2/2003 |
| JP | 2005-230825 | 9/2005 |

OTHER PUBLICATIONS

Machine Translation of JP 2005-230825—Mar. 19, 2011.*
International Search Report Dated Jun. 5, 2007.

* cited by examiner

*Primary Examiner* — Brian Jennison
(74) *Attorney, Agent, or Firm* — Pearne & Gordon LLP

(57) ABSTRACT

A tandem arc welding device in which the welding conditions and a program describing contents of operation are treated as independent to each other. It handles the welding conditions altogether simply as those parameters for the fore-going welding and those parameters for the hind-going welding. By so doing, a program can be produced without taking which of the two welders will become fore-going into consideration. Furthermore, a program and welding conditions thus provided offer superior re-usability and reproducibility to the tandem arc welding.

12 Claims, 7 Drawing Sheets

TANDEM ARC WELDING DEVICE

TECHNICAL FIELD

The present invention relates to a tandem arc welding device which performs certain specific operation patterns in accordance with a certain specific operation program for welding an object of welding at certain specific welding conditions.

BACKGROUND ART

In the industry manufacturing various kinds of structural members by making use of welding, efforts are being made to improve operation efficiency by increasing the speed of welding or introducing a high-deposition welding process. In order to further improve the efficiency, some welding firms have introduced an integrated welding torch which can supply two weld wires, or such a welding method which uses a single-electrode welding torch for two pieces disposed in proximity to each other. They are referred to as the tandem arc welding.

A tandem arc welding system performs a certain specific action at a certain specific speed and controls the welding process to accomplish a welding operation. An operation program is provided on an assumption that the two electrodes, including the weld wires which are supplied penetrating through respective electrodes, are disposed substantially on welding line in a certain welding section, in front and the rear orientation.

Now, a tandem arc welding device is described in its outline formation and operation, referring to FIG. 1. FIG. 1 shows the outline structure of a tandem arc welding device having an integrated 2-electrode welding torch. Integrated 2-electrode welding torch 50 is attached on a welding robot manipulator or the like working gear, not shown, and travels on the surface of welding object 60 along a certain specific welding line. A device for putting a robot manipulator, etc. into action is coupled with control unit 20. Control unit 20 is connected with two welders, 30 and 40. Respective welders 30 and 40 are provided with a weld wire feeder, not shown, for feeding a weld wire, not shown, to welding torch 60; namely, the torch is supplied with two weld wires. Within welding torch 50, each of the two weld wires is delivered penetrating through an electrode tip, not shown. The electrode tips are connected with output terminals of welder 30 and welder 40 via power cable 31 and power cable 42, respectively. Electric powers from welder 30 and welder 40 are supplied to respective weld wires. Welding object 60 is connected to the ground terminals of welder 30 and welder 40 by way of grounding cable 32 and grounding cable 41. The arcs between the weld wires and welding object 60 constitute circuits for the welding currents.

Control unit 20 houses an operation program and welding conditions, and controls a welding robot manipulator, etc. by transferring from time to time the instructions and parameters to welder 30 and welder 40 via control line 33 and control line 43 in accordance with the operation program. Welder 30 and welder 40 control their own weld wire feeders so that the weld wires are supplied for certain specified quantities corresponding to the parameters instructed by control unit 20. In this way, a tandem arc welding device implements a certain specific welding operation on welding object 60 at a certain specified place.

Now in the following, description is made on how a tandem arc welding is implemented, with reference to FIG. 2. FIG. 2 illustrates a scene where a tandem arc welding is being carried out with an integrated 2-electrode welding torch (ref. FIG. 1), in the direction from the right to the left. The terminologies here, "fore-going" means that which is proceeding ahead along a welding line, while "hind-going" means that which is going in chase of the "fore-going".

Reference is made to FIG. 2, there are two electrode tips, fore-going electrode tip 51 and hind-going electrode tip 52, disposed at a certain specific electrode-to-electrode distance within the inside of nozzle 58 of integrated 2-electrode welding torch 50. Fore-going electrode tip 51 is supplied with fore-going weld wire 53, while hind-going electrode tip 52 is supplied with hind-going weld wire 54.

Fore-going weld wire 53 obtains electric power from a welding power supply source for fore-going electrode, not shown, via fore-going electrode tip 51, and generates fore-going arc 55 between fore-going wire 53 and welding object 60. The heat of arcing melts fore-going wire 53 and welding object 60 to supply molten pool 61 with the molten metals. At the same time, hind-going weld wire 54 obtains electric power from a welding power supply source for hind going electrode, not shown, via hind-going electrode tip 52, and generates hind-going arc 56 between hind-going wire 54 and welding object 60. The heat of arcing melts hind-going wire 54 and welding object 60 to supply molten pool 61 with molten metals. Fore-going wire 53 and hind-going wire 54 are delivered continuously while integrated 2-electrode welding torch 50 travels at a certain specific speed. Molten metal pool 61 moves forward and weld bead 62 is formed behind it; thus, a welding operation takes place. Fore-going electrode tip 51 (or hind-going electrode tip 52) and fore-going weld wire 53 (or hind-going weld wire 54) are referred to as the electrode, altogether.

In a tandem arc welding, the fore-going electrode and the hind-going electrode have, respectively, their own specific roles. For example; in FIG. 2, the molten metals in molten pool 61 formed by fore-going arc 55 which is generated by fore-going wire 53 tends to flow backward under the influence of arcing power of fore-going arc 55. Meanwhile, the arcing power of hind-going arc 56 which is generated by hind-going wire 54 pushes it back. Molten pool 61 stands on a balance between the two powers. Besides the above-described, each of the electrodes plays specific role of its own for the weld penetration and the shaping of weld bead 62. Thus, the two electrodes are not playing the same functions. So, welder 30 and welder 40 need to be provided with different parameters of welding conditions in carrying out a welding.

Arrow mark 59 in FIG. 2 indicates, for example, a welding operation conducted in the forward direction, viz. a welding proceeding from the right to the left. On the other hand, if a welding is made along the reverse direction, the direction is opposite to that indicated by arrow mark 59, or the direction from the left to the right in FIG. 2. Since parameters to be sent to fore-going welder 30 (or welder 40) are different from those to be sent to hind-going welder 40 (or welder 30), the welding condition parameters for welder 30 and those for welder 40 have to be exchanged when making a welding the reverse direction. Therefore, when controlling the welding conditions in a conventional tandem arc welding device, the program is required to include a certain procedure for specifying which of the two will be the fore-going. As a practical example, there can be four modes: namely, a tandem welding mode which uses both of welders 30 and 40, with one of which specified as fore-going electrode; that which uses the other welder as the fore-going; and a single welding mode which uses only one of the welders 30 and 40 alone. In providing an operation program for a tandem arc welding, there has been a generally-used technique of specifying the modes. Such conventional technique used for tandem arc welding is disclosed in, for example, Patent Document 1 described later.

As described in the above, the conventional tandem arc welding devices has a restriction that the welding conditions need to be provided considering which of electrodes 50a or 50b will be the fore-going, and the operation program has to include such descriptions in it. This means that both the operation program for welding object 60 and the welding conditions described in there are dependent on a reality which one of the electrodes is the fore-going. Therefore, program making staff have always keep in mind which of the electrodes is going ahead of the other. Furthermore, this has another inconvenience that re-use of an operation program and welding conditions contained in there for other welding object 60 is limited.

[Patent Document 1]

Japanese Patent Unexamined Publication No. 2003-053535

DISCLOSURE OF THE INVENTION

A tandem arc welding device having two electrodes and operating on an operation program for welding a welding object, which welding device includes a welding conditions holding unit for holding those parameters of welding conditions containing an indication about an electric current and an indication about a voltage to be sent to a welder of fore-going electrode, among the two electrodes, proceeding ahead of the other on a welding direction, and those parameters of welding conditions containing an indication about an electric current and an indication about a voltage to be sent to a welder of hind-going electrode, among the two electrodes, proceeding behind the other electrode on the welding direction altogether in a state isolated from the operation program; a welding conditions editing unit for editing data items constituting the welding conditions; an electrode decision unit for deciding fore-going electrode based on fore-going electrode information which indicates as to which one of the two electrodes described in the operation program will be the fore-going; and a welder control unit which designates one of the two welders as welder of fore-going electrode while the other welder as welder of hind-going electrode, based on decision of the electrode decision unit, and sends the parameters for fore-going welding and the parameters for hind-going welding in the welding conditions of the welders, respectively.

REFERENCE MARKS IN THE DRAWINGS

20 Control Unit
30 Welder
31 Power Cable
32 Grounding Cable
33 Control Line
40 Welder
41 Grounding Cable
42 Power Cable
43 Control Line
50 Welding Torch
50a Electrode
50b Electrode
51 Electrode Tip
52 Electrode Tip
53 Weld Wire
54 Weld Wire
55 Arc
56 Arc
58 Nozzle
60 Welding Object
62 Weld Bead
61 Molten Metal
100 Welding Conditions Holding Unit
110 Table of Welding Conditions
111 Table of Welding Conditions
112 Table of Welding Conditions
120 Welding Condition Parameters for the Fore-going
130 Welding Condition Parameters for the Hind-going
140 Operation Program
150 Fore-going Electrode Information
160 Information for Designating Table of Welding Conditions
200 Welding Conditions Editing Unit
300 Electrode Decision Unit
400 Welder Control Unit
500 Welding Conditions Decision Unit

DETAILED DESCRIPTION OF THE PREFERRED EMBODIMENTS

The present invention offers a tandem arc welding device, in which the conditions of tandem arc welding and the operation program describing contents of the operation are provided to be independent to each other and the welding conditions are handled altogether simply as those parameters needed for foregoing welding and those for hind-going welding. By so doing, a program can be provided without considering which of the two will be used as welder of fore-going electrode. Furthermore, a program and welding conditions thus provided have superior re-usability and reproducibility.

Exemplary embodiments of the present invention are described below, referring to FIG. 1 through FIG. 7.

(First Exemplary Embodiment)

Figure 1:
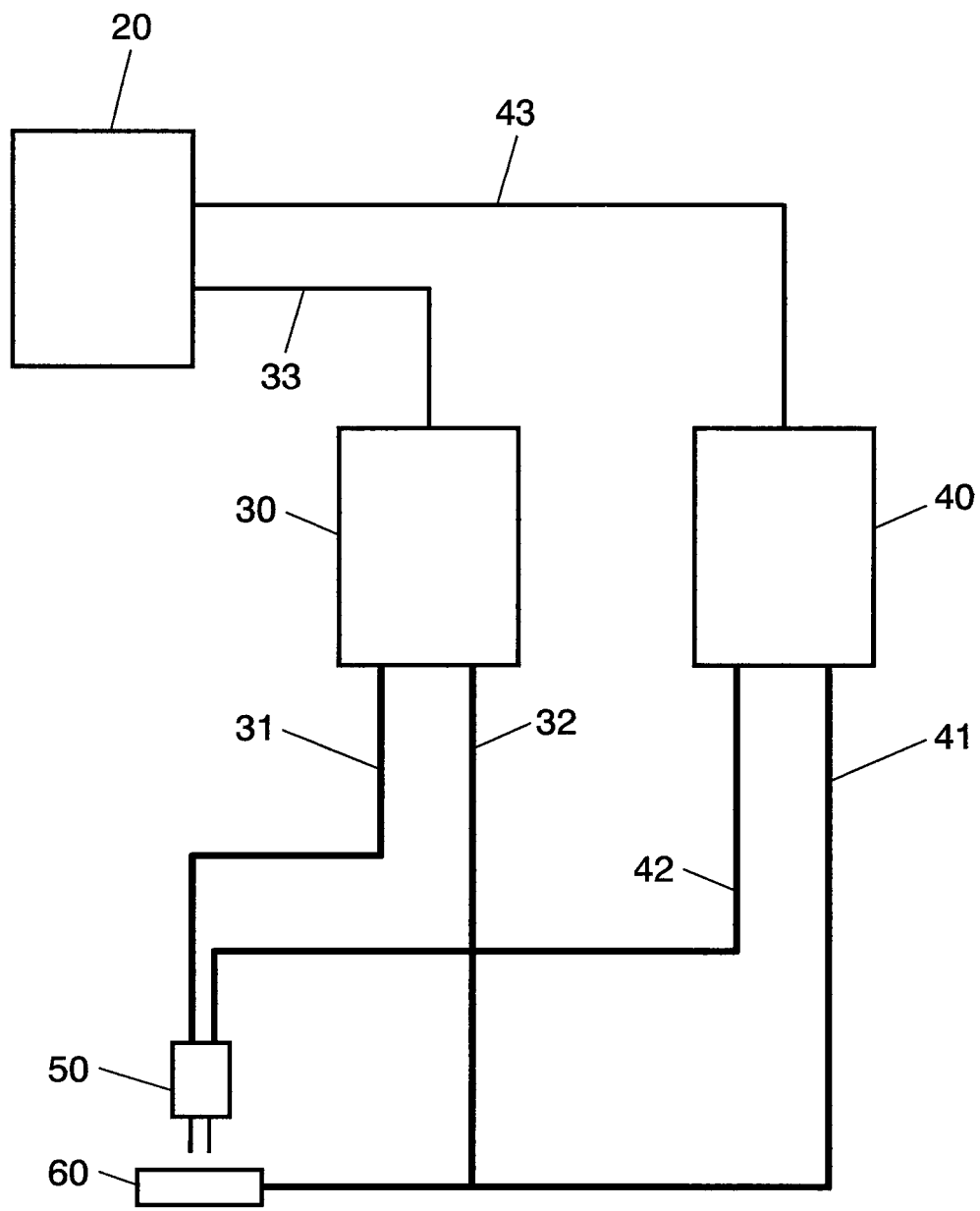
FIG. 1 shows the outline structure of a tandem arc welding device.
Figure 2:
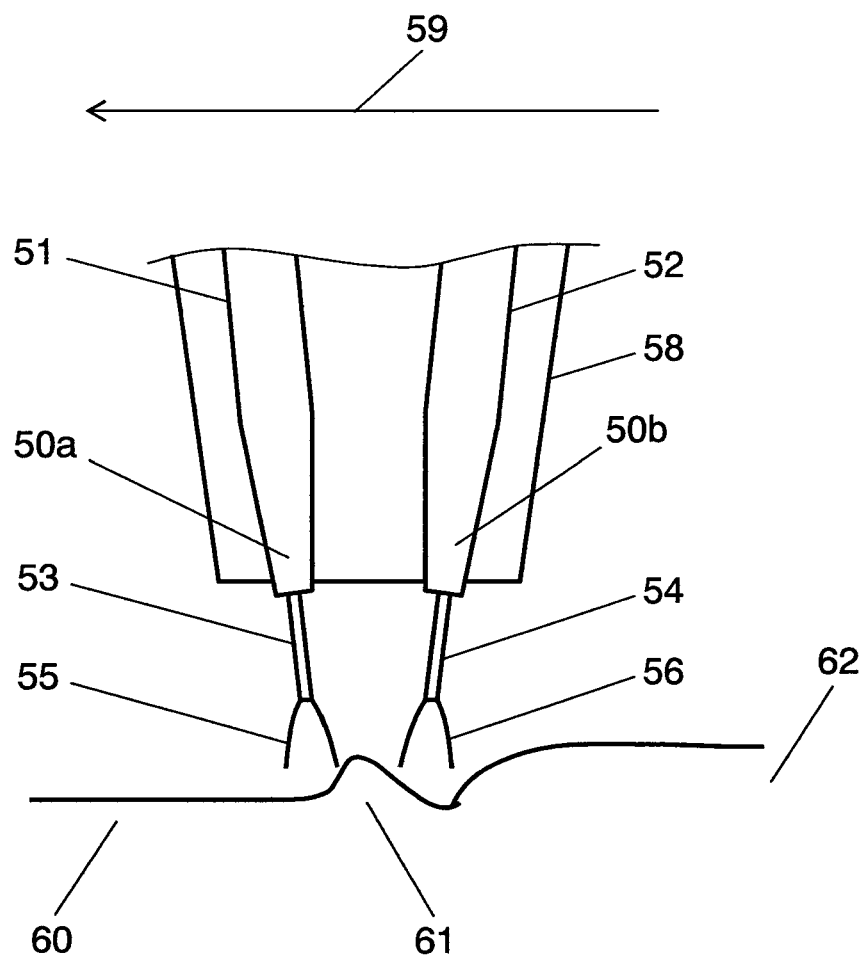
FIG. 2 shows a typified state of welding operation performed with an integrated 2-electrode welding torch.
Figure 3:
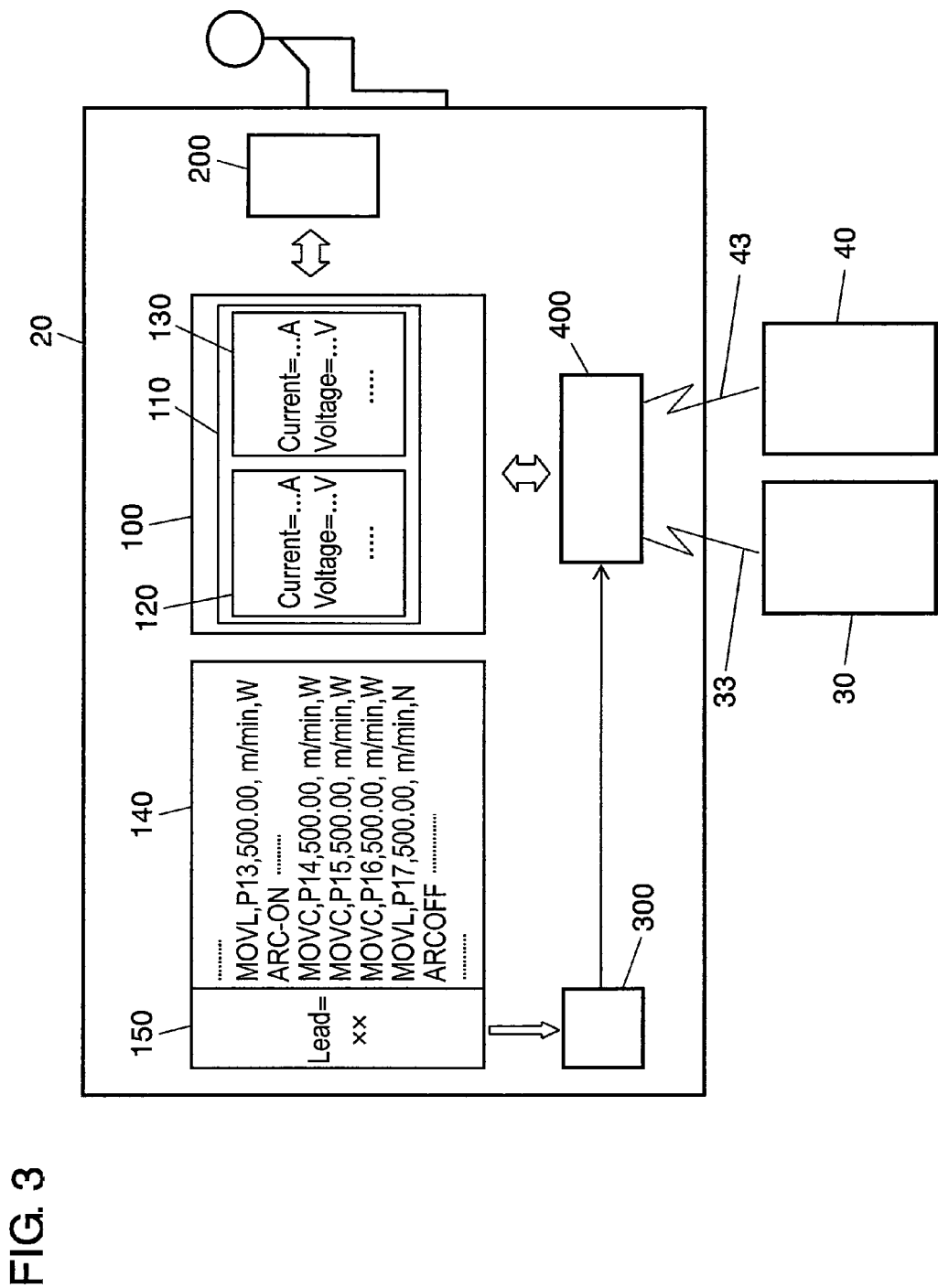
FIG. 3 is an illustration used to describe the functioning structure of a tandem arc welding device in accordance with a first exemplary embodiment of the present invention.

FIG. 3 is an illustration used to describe a tandem arc welding device in first embodiment of the present invention from the view point of functions performed by control unit 20 shown in FIG. 1. Those portions identical to those shown in FIG. 1 are designated using the same symbols, and detailed description on which portions are eliminated. In FIG. 3, control unit 20 is connected with welder 30 via control line 33, and welder 40 via control line 43.

In control unit 20, welding conditions holding unit 100 stores and administrates the welding condition parameters for the fore-going 120 (hereinafter referred to as parameters for fore-going 120) and the welding condition parameters for the hind-going 130 (parameters for hind-going 130), these parameters being bundled together as one set of welding conditions to be stored in welding conditions table 110 which is a separate existence independent of operation program 140. Parameters for fore-going 120 is a group of parameters which contain those indications about the electric current, voltage, with or without a pulse, and pulse waveform control parameter, etc. to be sent to welder 30 (or welder 40) of electrode 50a (or electrode 50b) which is proceeding ahead along welding direction. Parameters for hind-going 130 is a group of parameters containing those indications about the electric current, voltage, with or without a pulse, and pulse waveform control parameter, etc. to be sent to welder 40 (or welder 30) of electrode 50b (or electrode 50a) which proceeds behind along welding direction. Contents of welding conditions table 110 kept within welding conditions holding unit 100 can be edited by welding conditions editing unit 200 to desired values. Weld wire 53 (or weld wire 54) and electrode tip 51 (or electrode tip 52) altogether are referred to as electrode 50a (or electrode 50b).

As shown in FIG. 3, operation program 140 has, as the attribute information, fore-going electrode information 150 which indicates which of the electrodes 50a and 50b is positioned at the front on a welding line. Based on fore-going electrode information 150, electrode decision unit 300 decides which of the electrodes 50a and 50b will be fore-going electrode.

In an actual automatic operation, electrode decision unit 300 recognizes, in accordance with fore-going electrode information 150, one of the welders 30 and 40 as welder of fore-going electrode while the other welder as welder of hind-going electrode. Welder control unit 400 sends those parameters for fore-going 120 and for hind-going 130 which have been held in welding conditions holding unit 100 to corresponding welders 30 and 40 based on the results of recognition at electrode decision unit 300. A certain desired tandem arc welding is thus carried out.

If any one of the constituent parameter items for fore-going 120 and for hind-going 130, for example welding current value, is 0, it means that no welding is made by the relevant electrode. By so describing, the welding device can perform a single welding, not only the tandem welding.

As described in the above, a tandem arc welding device in the first embodiment can administrate those welding conditions without any regard to actual relative positioning among electrodes 50a and 50b as to which will be the fore-going. Furthermore, those parameters needed for carrying out a tandem arc welding can be administered altogether. This enables to administer the welding conditions with superior re-usability and reproducibility.

(Second Exemplary Embodiment)

Figure 4:
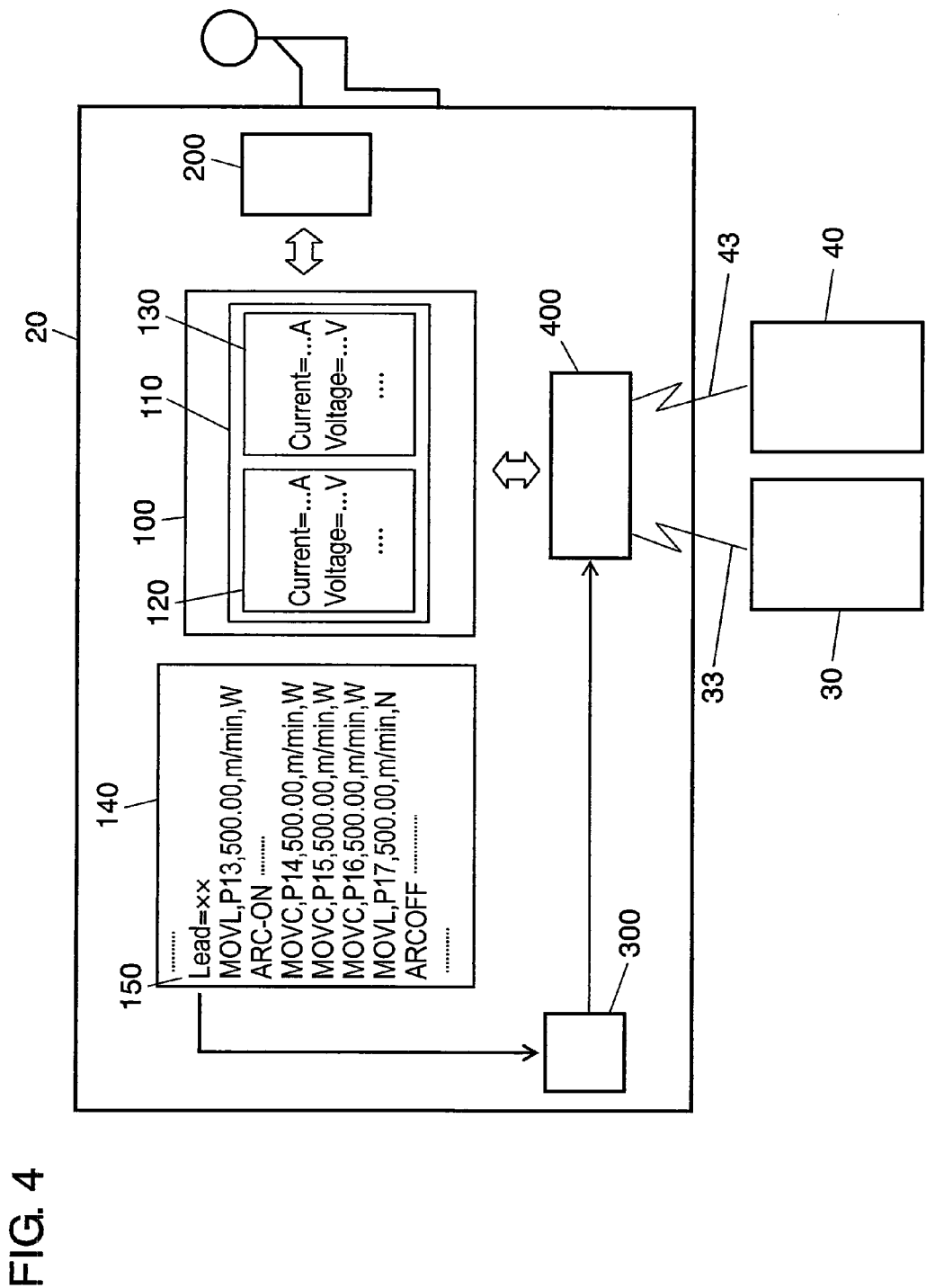
FIG. 4 is an illustration used to describe the functioning structure of a tandem arc welding device in accordance with a second exemplary embodiment of the present invention.

FIG. 4 is an illustration used to describe a tandem arc welding device in second embodiment of the present invention from the view point of functions performed by control unit 20 shown in FIG. 1. Those portions identical to those shown in FIG. 1 are designated using the same symbols, and detailed description on which portions are eliminated. Unlike the first embodiment, no fore-going electrode information 150 is provided, as attribute information, in operation program 140 of a tandem arc welding device in the second embodiment. Fore-going electrode information 150 is described as an order in operation program 140 in a tandem arc welding device in the second embodiment; based on the description, electrode decision unit 300 decides which of the electrodes 50a and 50b will be the fore-going. The above described is the point of difference from the tandem arc welding device in first embodiment.

As described in the above, a tandem arc welding device in the second embodiment offers an advantage, in addition to that of the first embodiment, that which one of the electrodes will be the fore-going, 50a or 50b, can be exchanged freely in a program. This provides a higher degree of freedom in the use a tandem arc welding device, and the field of application will become broader to include, for example, a welding robot system.

(Third Exemplary Embodiment)

Figure 5:
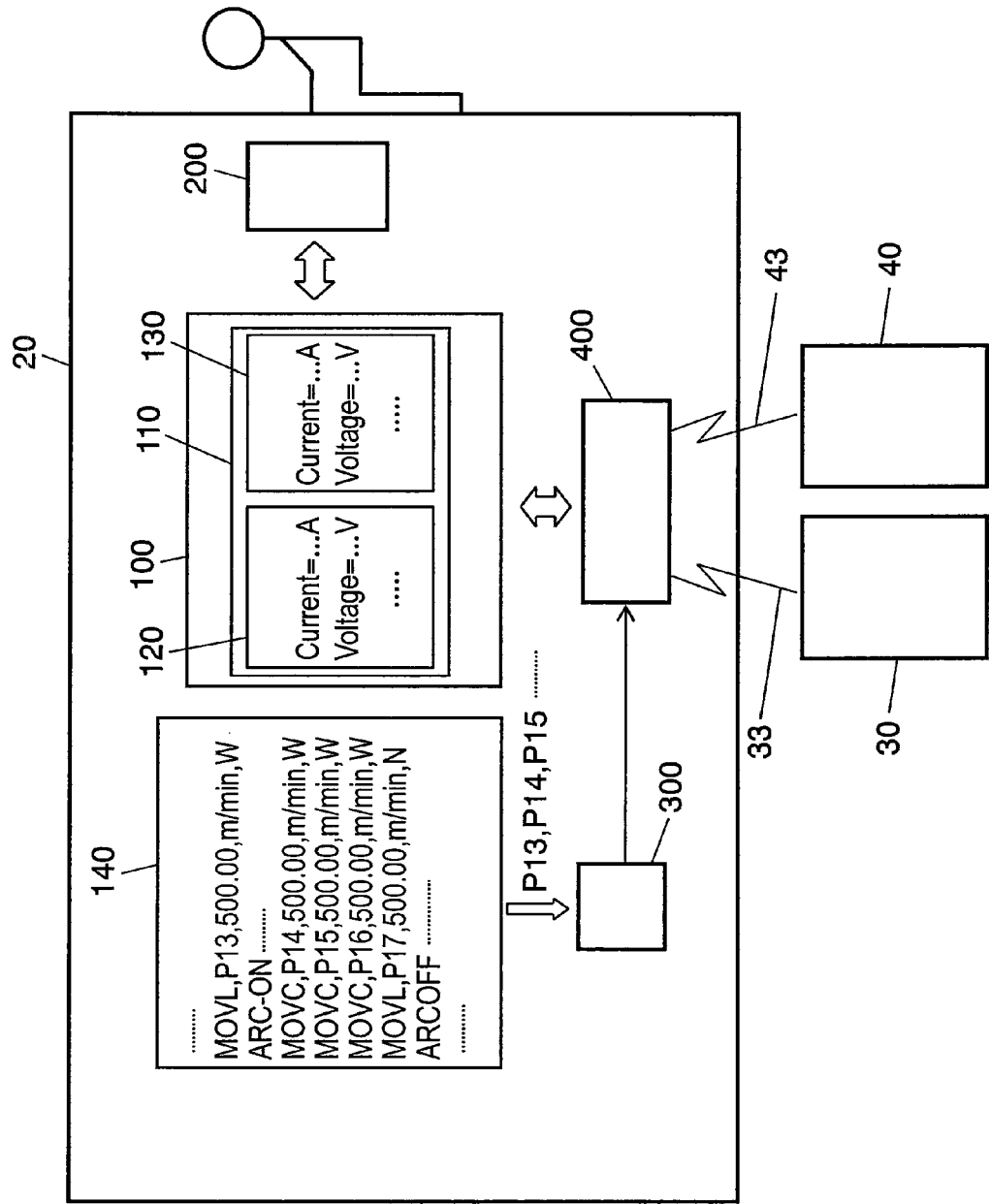
FIG. 5 is an illustration used to describe the functioning structure of a tandem arc welding device in accordance with a third exemplary embodiment of the present invention.

FIG. 5 is an illustration used to describe a tandem arc welding device in third embodiment of the present invention from the view point of functions performed by control unit 20 shown in FIG. 1. Those portions identical to those shown in FIG. 1 are designated using the same symbols, and detailed description on which portions are eliminated. Unlike the first embodiment, no fore-going electrode information 150 is provided, as attribute information, in operation program 140 of a tandem arc welding device in third embodiment. In a tandem arc welding device in accordance with third embodiment, electrode decision unit 300 judges as to which of the electrodes 50a and 50b is to be the fore-going on the basis of a direction of welding line registered in operation program and a stance of a robot (a holding device) which holds welding torch 50. Based on the above, electrode decision unit 300 decides which of the electrodes, 50a or 50b, will be the fore-going. The above described is the point of difference from a tandem arc welding device of the first embodiment.

Representing a location and posture of a robot with homogeneous transformation matrix T6, the elements of T6 are consisting of approaching vector a, directional vector o, slope line vector n and placement vector p. Direction from one of the electrodes (electrode 50a) towards the other electrode (electrode 50b) is represented with directional vector o.

$$T6 = \begin{bmatrix} nx & ox & ax & px \\ ny & oy & ay & py \\ nz & oz & az & pz \\ 0 & 0 & 0 & 0 \end{bmatrix}$$

Assuming a vector from place P13 registered in operation program 140 towards place P14 as 1=(1x, 1y, 1z), an angle α formed between vector o and vector 1 is given by the inner product. If, for example, α is smaller than 90 degrees, electrode 50b is judged to be the fore-going, if α is exceeding 90 degrees, electrode 50a is judged to be the fore-going.

As described in the above, a tandem arc welding device in the third embodiment offers an advantage, in addition to that of the first embodiment, that which one of the electrodes will be the fore-going, 50a or 50b, can be exchanged freely. Furthermore, which will be the fore-going does not need to be considered in producing a program. This provides a higher degree of freedom in the use a tandem arc welding device, and the field of application will become broader to include, for example, a welding robot system.

(Fourth Exemplary Embodiment)

Figure 6:
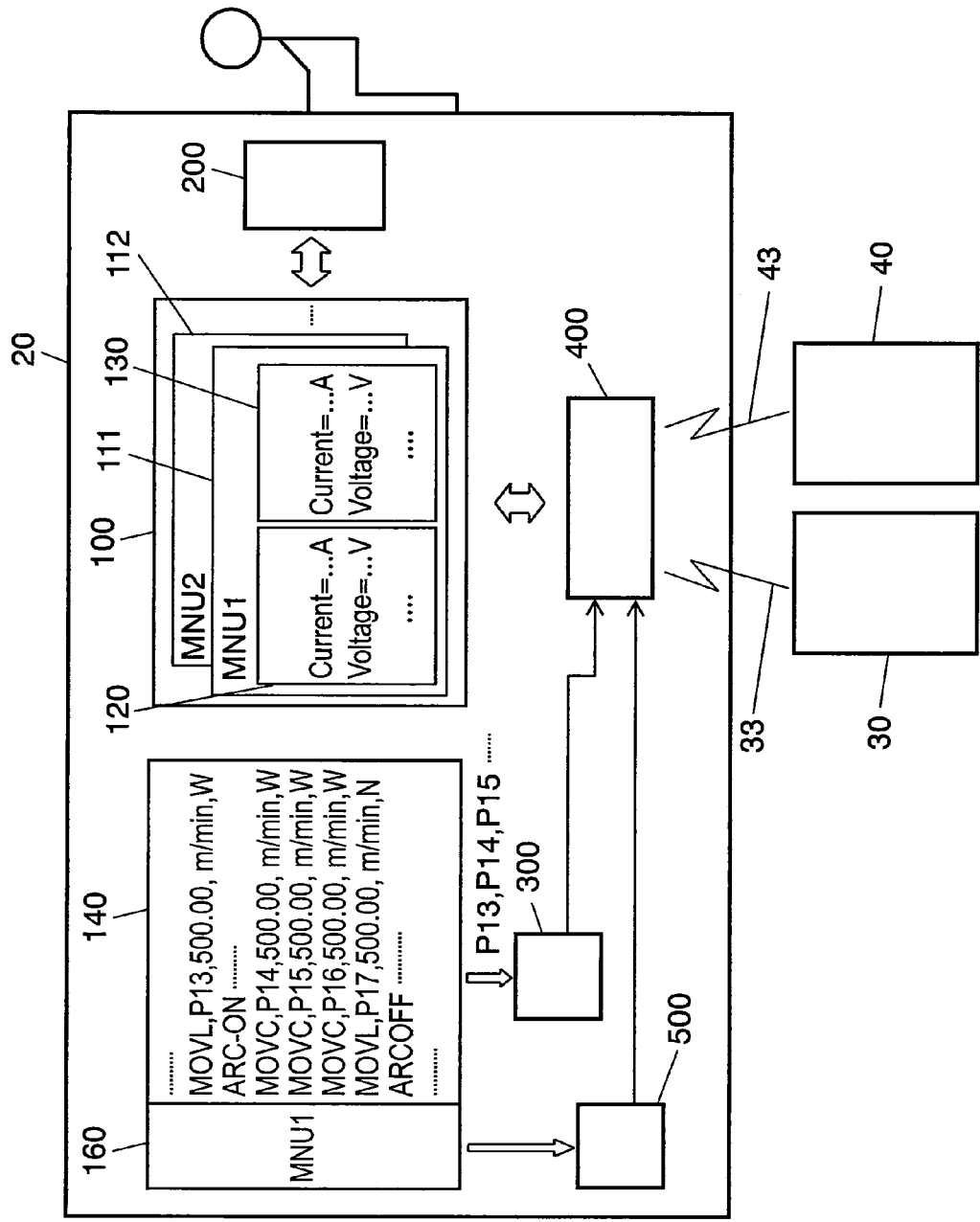
FIG. 6 is an illustration used to describe the functioning structure of a tandem arc welding device in accordance with a fourth exemplary embodiment of the present invention.

FIG. 6 is an illustration used to describe a tandem arc welding device in fourth embodiment of the present invention from the view point of functions performed by control unit 20 shown in FIG. 1. Those portions in fourth embodiment which are identical to those of the first through third embodiments are designated using the same symbols, and detailed description on which portions are eliminated. Unlike the first through third embodiments, number of welding conditions table 110 is not limited to 1 in a tandem arc welding device in accordance with fourth embodiment. A tandem arc welding device in fourth embodiment is structured so that it can hold a plurality of welding conditions tables; welding conditions table 111, welding conditions table 112, etc. Operation program 140 has information for designating welding conditions table 160, as attribute information, which specifies a certain specific welding conditions table. Based on information for designating welding conditions table 160, welding conditions decision unit 500 decides which of the welding conditions, among those contained in the plurality of welding conditions tables, are to be used, and welder control unit 400 makes use of the result of the decision. The above described is the point of difference from the first through third embodiments.

When welder control unit 400 sends those parameters for fore-going 120 and parameters for hind-going 130 included in welding conditions table 111, or welding conditions table 112, to the corresponding welders 30 and 40, one of suitable methods described in the first through third embodiments may be used.

As described in the above, a tandem arc welding device in fourth embodiment provides a further advantage, besides those advantages described in the first through fourth embodiments, that it can be used for welding at a plurality of joints, not at a single joint alone. Thus a tandem arc welding device will have a broader field of application.

(Fifth Exemplary Embodiment)

Figure 7:
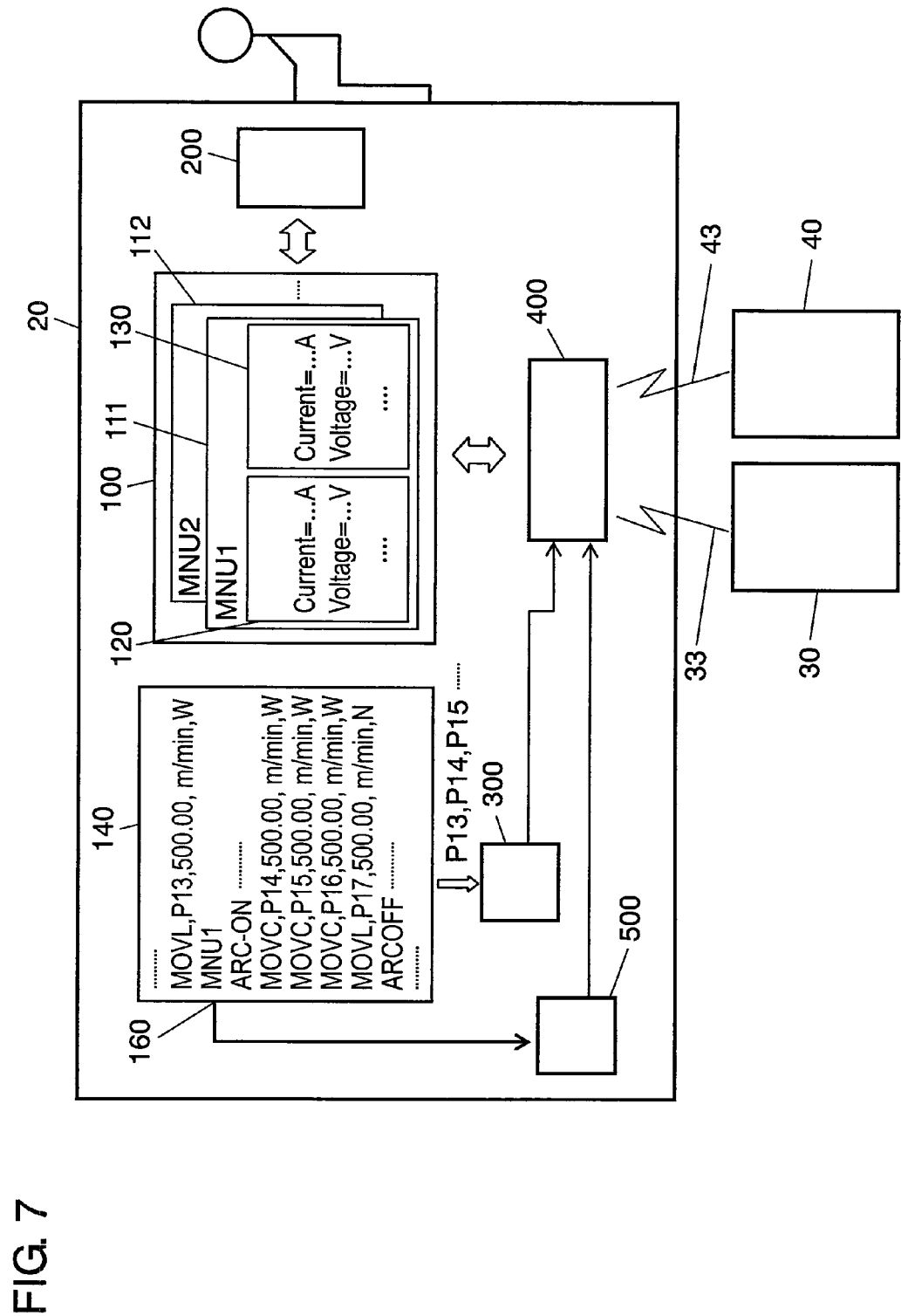
FIG. 7 is an illustration used to describe the functioning structure of a tandem arc welding device in accordance with a fifth exemplary embodiment of the present invention.

FIG. 7 is an illustration used to describe a tandem arc welding device in fifth embodiment of the present invention from the view point of functions performed by control unit 20 shown in FIG. 1. In a tandem arc welding device in accordance with fifth embodiment, operation program 140 describes a plurality of information for designating welding conditions table 160 as an order. Welding conditions decision unit 500 decides which one of the plurality of welding conditions tables is to be used, and welder control unit 400 makes use of the result of the decision. The above described is the point of difference from the fourth embodiment.

As described in the above, a tandem arc welding device in the fifth embodiment provides a further advantage, in addition to that of the fourth embodiment, that it can optionally specify in the program if a welding is to be made at a plurality of joints, not only at a single joint alone. Thus a tandem arc welding device will be provided with a broader field of application.

As described in the above first through fifth embodiments, a tandem arc welding device in accordance with the present invention can handle a number of tandem arc welding conditions, isolated from actual operating environments where what matters is which one of the two welders will be the foregoing. Furthermore, each one of the welding conditions can be determined at a certain desired value. Since in an actual automatic welding operation a judgment as to which one of the welders will be fore-going is made automatically by scrutinizing the relevance in the contents of operation program and the welding is controlled accordingly, a program can be produced without taking which one of the welders is of the fore-going electrode into consideration. A program and welding conditions thus provided exhibit superior advantages in the re-usability and reproducibility. This makes it easier to introduce the tandem arc welding, where two welders are driven in complexity, to the actual production floor.

INDUSTRIAL APPLICABILITY

A tandem arc welding device in the present invention treats the tandem arc welding conditions isolated from the program which describes contents of operation, and keeps those welding conditions for fore-going and for hind-going altogether simply as a group of parameters regardless of which one of the two welders will be of the fore-going electrode. By so doing, a program can be produced without taking which of the two welders will become a welder of fore-going electrode into consideration. Thus the welding conditions can be administered with superior re-usability and reproducibility. In this way, the present invention would bring about an advantage to the industry by making it easier to introduce the tandem arc welding, which requires complex control on the two welders, to an ordinary production floor.

The invention claimed is:

1. A tandem arc welding device operating in accordance with an operation program for welding a welding object, wherein the welding device is movable in a forward direction and a backward direction, the welding device comprising:
 a welding conditions holding unit for holding
  fore-going welding condition parameters to be sent to a welder having a fore-going electrode, where the fore-going electrode proceeds along a welding direction, and where the fore-going welding condition parameters include a fore-going electric current indication and a fore-going voltage indication, and
  hind-going welding condition parameters to be sent to a welder having a hind-going electrode, where the hind-going electrode proceeds behind the fore-going electrode along the welding direction, where the hind-going welding condition parameters include a hind-going electric current indication and a hind-going voltage indication,
  wherein the fore-going welding condition parameters and the hind-going welding condition parameters are stored together as welding conditions in a welding conditions table,
  wherein the welding conditions table is independent of the operation program;
 a welding conditions editing unit for editing data items constituting the welding conditions stored in the welding conditions table;
 an electrode decision unit that makes a decision as to which of the two electrodes becomes the fore-going electrode, based on fore-going electrode information of the operation program; and
 a welder control unit which designates, based on the decision made by the electrode decision unit, one of the two welders as the welder having the fore-going electrode and the other welder as the welder having the hind-going electrode, and sends the fore-going welding condition parameters to the welder having a fore-going electrode and the hind-going welding condition parameters to the welder having a hind-going electrode.

2. The tandem arc welding device of claim 1, wherein the fore-going electrode information is an attribute information of the operation program indicating which of the two electrodes proceeds ahead of the other along a certain welding line.

3. The tandem arc welding device of claim 1, wherein the fore-going electrode information is described in the operation program as an order.

4. The tandem arc welding device of claim 1, wherein the electrode decision unit decides which of the two electrodes becomes the fore-going electrode based on the direction of welding line registered in the operation program and the posture of a holding gear holding welding torches.

5. The tandem arc welding device recited in claim 1, wherein
the welding conditions holding unit holds a plurality of the welding conditions,
a welding conditions decision unit is further provided for designating a certain welding conditions among the plurality of welding conditions, and
the welding conditions decision unit designates one welding conditions based on welding conditions indication information which is an attribute information of the operation program.

6. The tandem arc welding device recited in claim 1, wherein
the welding conditions holding unit holds a plurality of the welding conditions,
a welding conditions decision unit is further provided for designating one welding conditions among the plurality of welding conditions, and
the welding conditions decision unit designates a certain welding conditions based on the welding conditions indication information which is described in the operation program as an order.

7. The tandem arc welding device recited in claim 2, wherein
the welding conditions holding unit holds a plurality of the welding conditions,
a welding conditions decision unit is further provided for designating a certain welding conditions among the plurality of welding conditions, and
the welding conditions decision unit designates one welding conditions based on welding conditions indication information which is an attribute information of the operation program.

8. The tandem arc welding device recited in claim 3, wherein
the welding conditions holding unit holds a plurality of the welding conditions,
a welding conditions decision unit is further provided for designating a certain welding conditions among the plurality of welding conditions, and
the welding conditions decision unit designates one welding conditions based on welding conditions indication information which is an attribute information of the operation program.

9. The tandem arc welding device recited in claim 4, wherein
the welding conditions holding unit holds a plurality of the welding conditions,
a welding conditions decision unit is further provided for designating a certain welding conditions among the plurality of welding conditions, and
the welding conditions decision unit designates one welding conditions based on welding conditions indication information which is an attribute information of the operation program.

10. The tandem arc welding device recited in claim 2, wherein
the welding conditions holding unit holds a plurality of the welding conditions,
a welding conditions decision unit is further provided for designating one welding conditions among the plurality of welding conditions, and
the welding conditions decision unit designates a certain welding conditions based on the welding conditions indication information which is described in the operation program as an order.

11. The tandem arc welding device recited in claim 3, wherein
the welding conditions holding unit holds a plurality of the welding conditions,
a welding conditions decision unit is further provided for designating one welding conditions among the plurality of welding conditions, and
the welding conditions decision unit designates a certain welding conditions based on the welding conditions indication information which is described in the operation program as an order.

12. The tandem arc welding device recited in claim 4, wherein
the welding conditions holding unit holds a plurality of the welding conditions,
a welding conditions decision unit is further provided for designating one welding conditions among the plurality of welding conditions, and
the welding conditions decision unit designates a certain welding conditions based on the welding conditions indication information which is described in the operation program as an order.

* * * * *